United States Patent [19]

Reed

[11] 4,226,150

[45] Oct. 7, 1980

[54] DEFLECTABLE BEARER ROLL

[75] Inventor: Charles F. Reed, Leroy Township, Lake County, Ohio

[73] Assignee: Avery International Corporation, San Marino, Calif.

[21] Appl. No.: 934,057

[22] Filed: Aug. 15, 1978

[51] Int. Cl.[2] .......................... B23D 25/12; B26D 1/40

[52] U.S. Cl. .......................................... 83/346; 83/348; 83/344; 83/659

[58] Field of Search ................. 83/346, 348, 344, 343, 83/659, 673, 694

[56] References Cited

U.S. PATENT DOCUMENTS

| | | | |
|---|---|---|---|
| 3,274,874 | 9/1966 | Treiber et al. | 83/348 |
| 3,289,513 | 12/1966 | Johnson et al. | 83/344 |
| 3,965,786 | 6/1976 | D'Luhy | 83/659 |

*Primary Examiner*—Donald R. Schran
*Attorney, Agent, or Firm*—Pearne, Gordon, Sessions

[57] ABSTRACT

This invention relates to die-cutting roll presses and, more particularly, to a means for adjusting the spacing between the axes of the anvil roll and the die roll of a press.

8 Claims, 11 Drawing Figures

FIG. 2
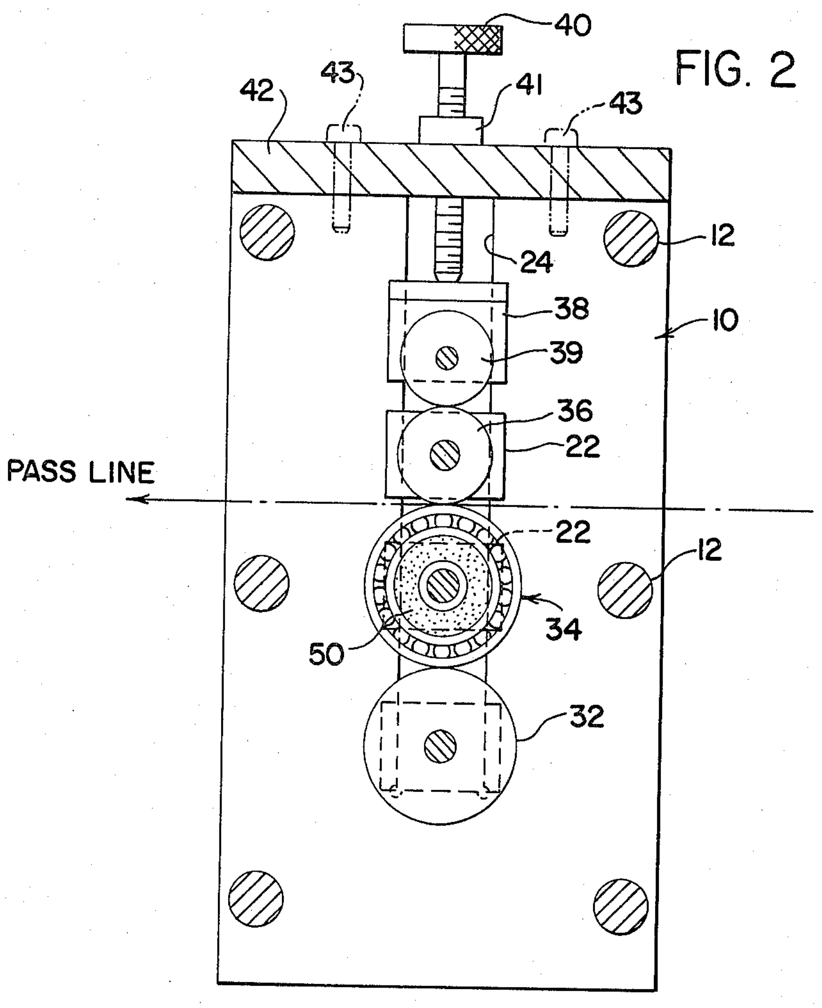
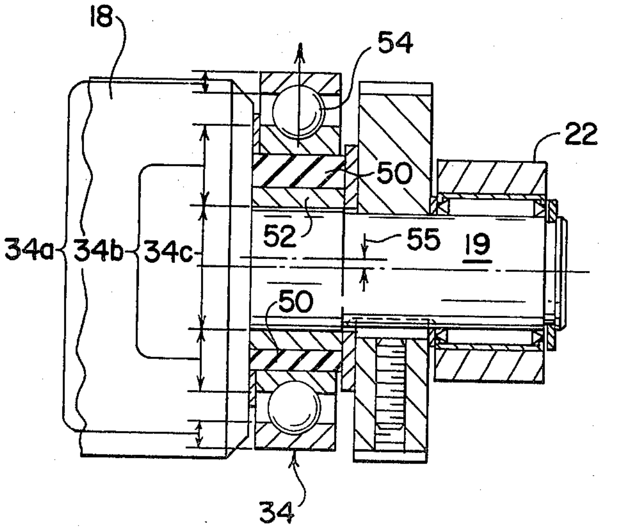
FIG. 3A

FIG. 7
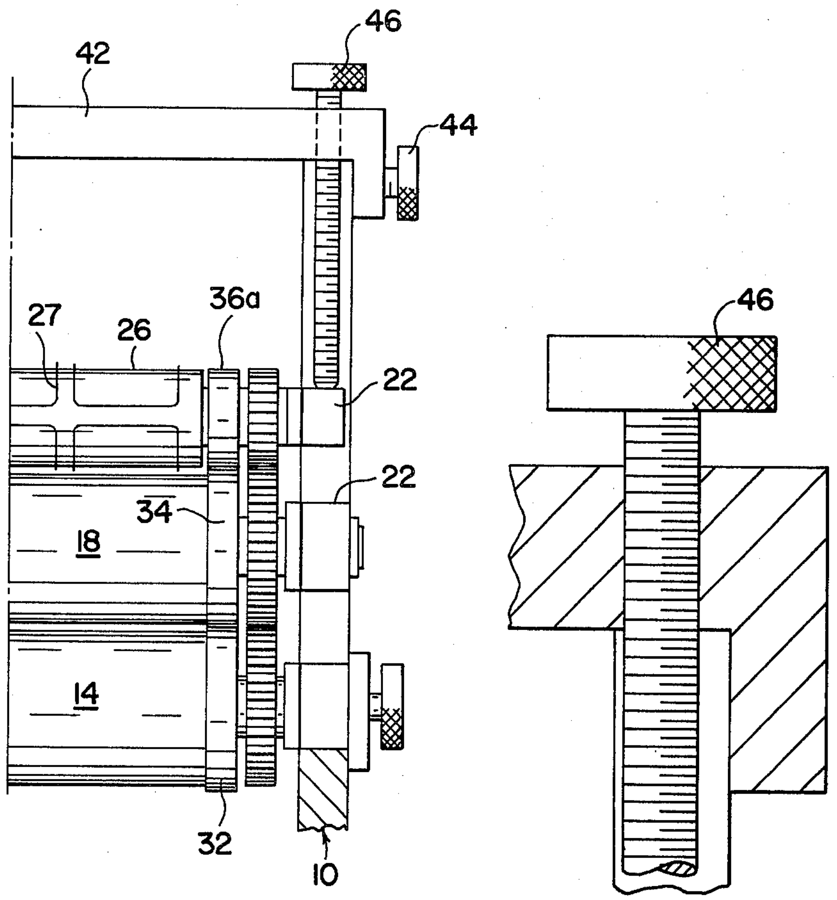
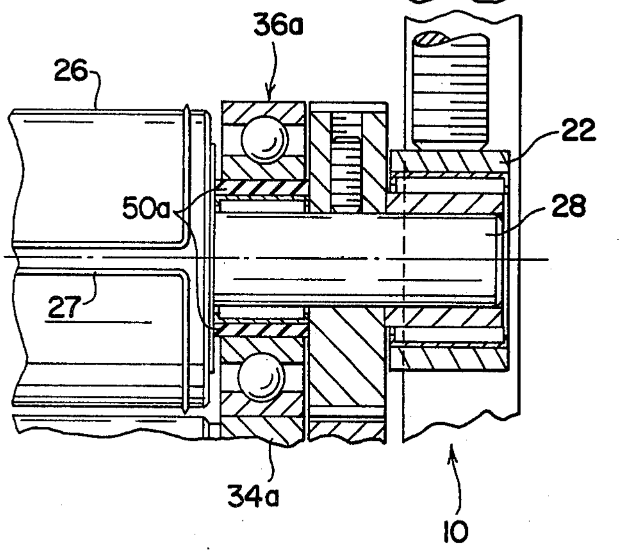
FIG. 9

DEFLECTABLE BEARER ROLL

Die-cutting roll presses have long been used to cut labels from continuous webs of label stock. Label stock is a lamination of face stock from which the labels are to be cut, an undercoating of pressure-sensitive adhesive, and a carrier or backing strip provided with a release coating to allow separation of the backing strip and the pressure-sensitive adhesive. The cutting die is designed to cut out a series of labels, leaving them supported on the liner, so that the matrix of label material and associated pressure-sensitive adhesive which represents waste material can be peeled away following the cutting operation, leaving individual labels supported on the backing strip. The dies must therefore cut through the label material and the pressure-sensitive adhesive without severing or unduly weakening the liner. Very accurate spacing between the die cutters and the anvil roll is therefore required. This spacing is defined by bearers or regions of increased diameter at the ends of the die roll and anvil roll. The bearers of one roll are in rolling contact with the bearers of the other roll and define an exact spacing between the roll axes, and therefore between the anvil roll and the edges of the cutters on the die roll.

If the carrier strip of the label stock varies in thickness, as frequently happens after changeover from one roll to the next, or may even happen in the course of processing a roll of label stock, the optimum spacing between the rolls changes, but cannot be adjusted without removal of at least one of the rolls and its replacement in order to provide a different relationship between the bearer diameters of the respective rolls, and therefore a different spacing.

In my copending application Ser. No. 818,546, filed July 25, 1977, I have shown a means for providing adjustability of this spacing without removal of the rolls from the press by the provision of adjusting brackets for one of the rolls which provide an eccentric mounting for that roll. A linkage is then provided for rotating the brackets to thereby adjust eccentricity.

The present invention effects adjustment in a simplified manner by changing the eccentricity without the use of brackets and linkages. Rather, radially intermediate portions of the bearers associated with one of the rolls include annuli or other means whose deflectability is relatively great, as compared to the deflectability of other parts of the bearers. Adjustable imposition of bearing loads across the deflectable annuli accomplishes the change in eccentricity by providing relative displacement between the roll axis and the associated roll bearers.

The following description will give a more complete understanding of the invention. In the accompanying drawings:

FIG. 2 is a view taken on the plane of line 2—2 of FIG. 1.

FIG. 3A is a view on an enlarged scale of the structure at the right end of FIG. 3, but taken in a horizontal plane and illustrating a deflected condition.

FIG. 4 illustrates a deflected condition. FIG. 5 does not.

FIG. 7 is a view similar to the right hand portion of FIG. 1, illustrating another example of the invention.

FIG. 9 illustrates a portion of the apparatus seen in FIG. 7 on an enlarged scale and partly broken away.

Figure 1:
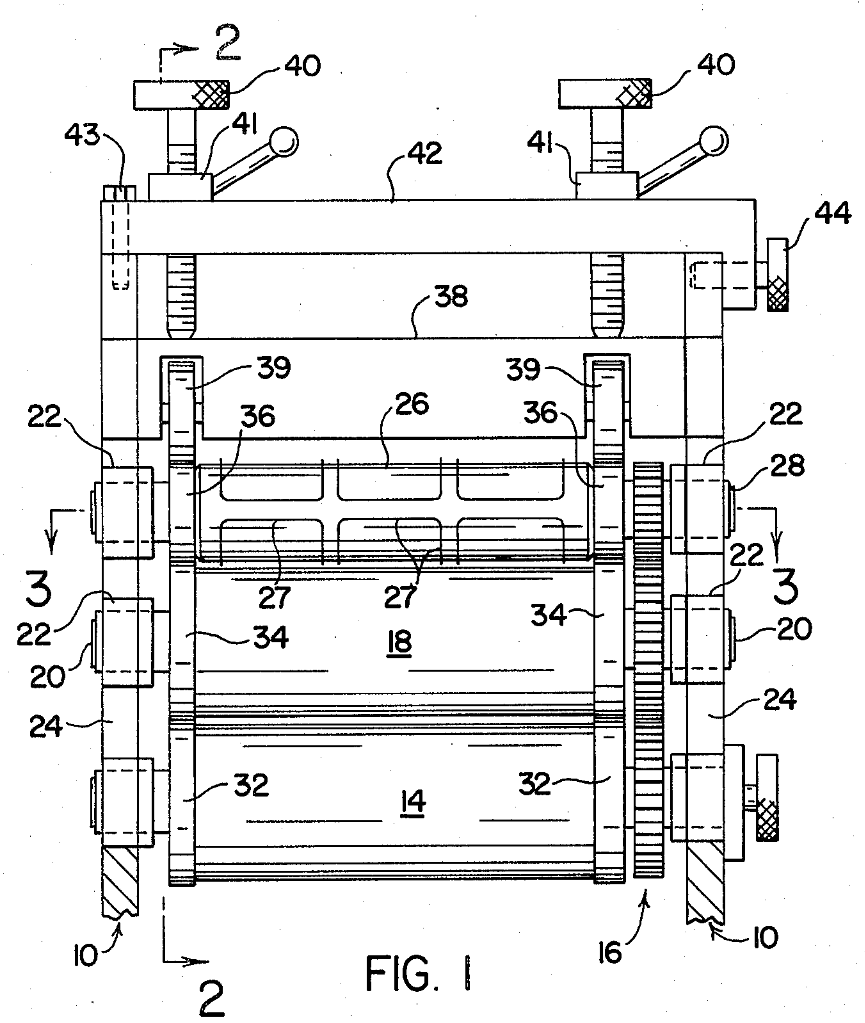
FIG. 1 is an end elevation of a rotary die cutter assembly, partly broken away, illustrating an example of the invention.

Referring to the drawings, a pair of frame plates 10 (FIGS. 1,2) are supported by crossbars 12 (FIG. 2) in parallel, spaced relationship. The shaft ends of a drive roll 14 are journalled in bearings supported by the frame plates 10. The drive roll is powered by a suitable motor drive (not shown) and drives the remaining rolls through a gear train 16 (FIG. 1).

An anvil roll 18 has shaft ends 20 journalled in bearing blocks 22, which are supported and guided for vertical movement in slots 24 (FIG. 1) in the frame plates 10, so that the axis of the anvil roll can move only vertically, and not laterally, when the bearing blocks move in the slots.

A die roll 26 is similarly mounted above the anvil roll, and has shaft ends 28 mounted in its own bearing blocks 22 which are received in the slots 24 so that the axis of the die roll 26 also can be shifted only vertically and not laterally.

The rolls 14, 18, and 26 are provided, respectively, with pairs of end bearers 32, 34, and 36, which are in rolling contact to establish the spacing between the rolls, and particularly between the die roll 26 and the anvil roll 18. The spacing between the cutting dies 27 and the surface of the anvil roll 18 is thereby accurately maintained.

A pressure block 38 is provided with pressure rollers 39, which bear down on the stacks of bearers 32, 34, 36 under the constraint of the pressure screws 40, which are mounted in a pressure bridge 42. The pressure screws may be provided with handled lock nuts 41. The pressure bridge is fixed to the tops of the frame plates 10 by the shoulder bolts 43 and retaining screws 44 (only one of which can be seen in the drawings). The ends of the pressure block 38 ride in the slots 24.

Figure 3:
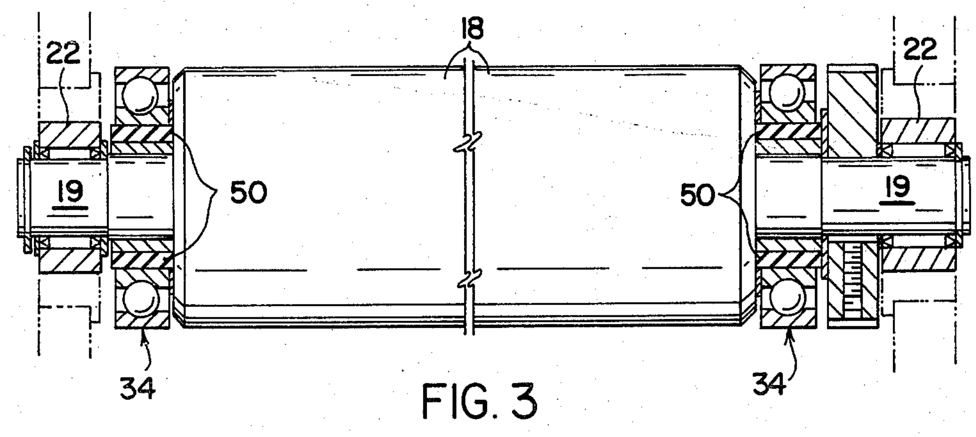
FIG. 3 is a view, partly broken away, on an enlarged scale, taken on the plane of the line 3—3 in FIG. 1.

According to the invention, one of the pair of rolls comprising the anvil roll 18 and the die roll 26 is provided with bearers having intermediate portions whose deflectability is relatively great as compared to the deflectability of other parts of the associated bearers. Thus, in FIG. 2, the bearers 34 for the anvil roll 18 each include a deflectable annulus 50 (FIGS. 2, 3, 3A) of elastomeric material having a much lower spring rate than the steel parts of the device. This annulus can therefore relatively readily deflect under appropriate loads, as seen in FIG. 3A, which is taken on a horizontal plane, and in which the portion of the annulus 50 on one side of the bearer will be seen to be relatively compressed as compared to the other side so as to provide an offset or eccentricity 55 between the axis of the anvil roll 18 and the illustrated bearer 34.

The annulus 50 is included in an intermediate portion **34*b* of each bearer roll 34 between (1) and inner bushing 52 adapted to rotate on a corresponding end shaft 19 of the anvil roll 18 and (2) the inner race of a roller bearing 54. The intermediate portion 34*b* of the bearer 34 is made up of such inner race of the outer bearing 54 and the elements 50 and 52. A radially outer portion 34*a* of the bearers 34 comprises the outer race of the bearing 54. The radially innermost portion 34*c* of the bearer 34 comprises the portion of the end shaft 19 within the bearer. The end shaft 19, of course, rotates with the anvil roll 18**.

Figure 6:
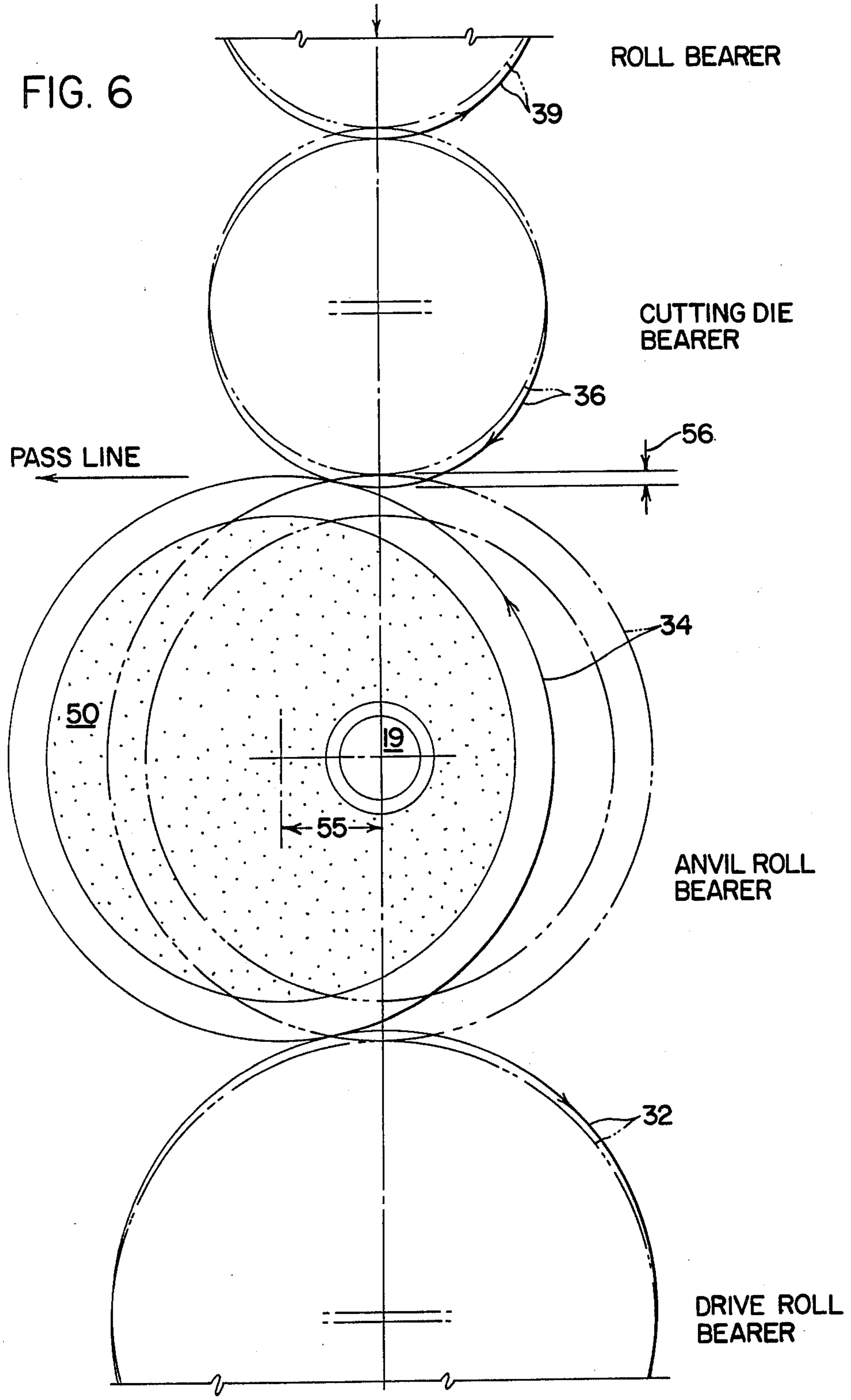
FIG. 6 is a diagrammatic view illustrating relative displacements of certain elements of the construction illustrated in FIGS. 1–3.

Deflection of the annuli and the resulting eccentricity of the bearers 34, and therefore adjustment of the spacing between anvil roll 18 and die roll 26, are illustrated diagrammatically in FIG. 6. This diagram shows the relative positions of the bearers 32, 34, 36, and pressure rollers 39, rather than showing their absolute vertical positions. Of course, the absolute vertical positions tend to shift downwardly as clamping forces are imposed from above on the stacks of bearers.

As the pressure screws are tightened, clamping-force loading on opposite sides of each bearer 34 is imposed by the associated bearers 32 and 36. Meanwhile the axis of the anvil roll 18 associated with the bearers 34 is constrained against lateral movement by the associated bearing blocks 22 and slots 24. The application and increase of clamping-force loading therefore tends to increasingly deflect the annulus 50 of each bearer 34 and to increasingly laterally displace the radially outer portions of each bearer 34 out from between the bearers 32 and 36 to thereby increasingly augment the eccentricity 55 and increasingly decrease the spacing between the die roll 26 associated with the bearer 36 and the anvil roll 18 associated with the bearer 34. In FIG. 6, this decrease in distance is through the distance 56, which corresponds to the approaching displacement of the axis of the die roll 26 relative to the axis of the anvil roll 18.

Figure 4:
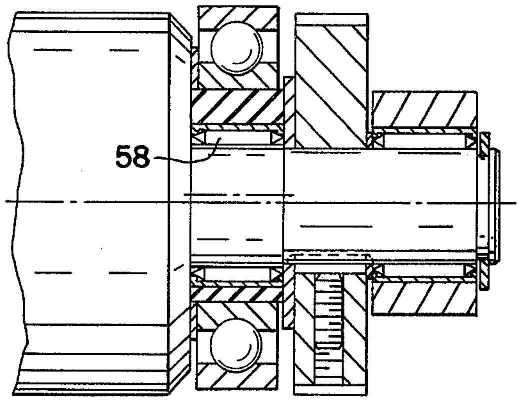
FIGS. 4 and 5 are views similar to FIG. 3A, showing alternative bearing arrangements
Figure 5:
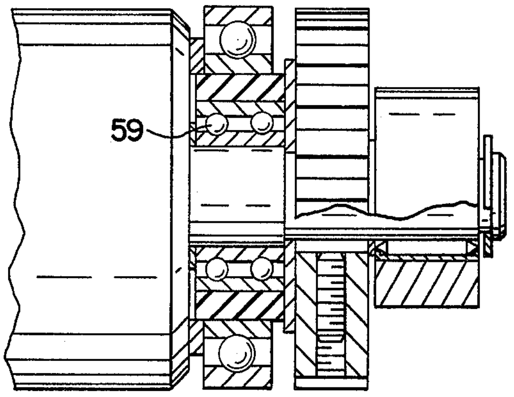

In FIG. 4, the bushing 52 of FIG. 3A is replaced by a needle bearing 58, and, in FIG. 5, by a compound roller bearing 59. In the latter case, the radially inner portion of the bearer will be understood to include not only the surrounded portion of the end shaft of the associated roll, but also the inner race of the bearing 59. The radially intermediate portion of the bearer includes the outer race of such bearing. In FIG. 4, the intermediate portion will be understood to include the cage of the needle bearing 58.

Figure 8:
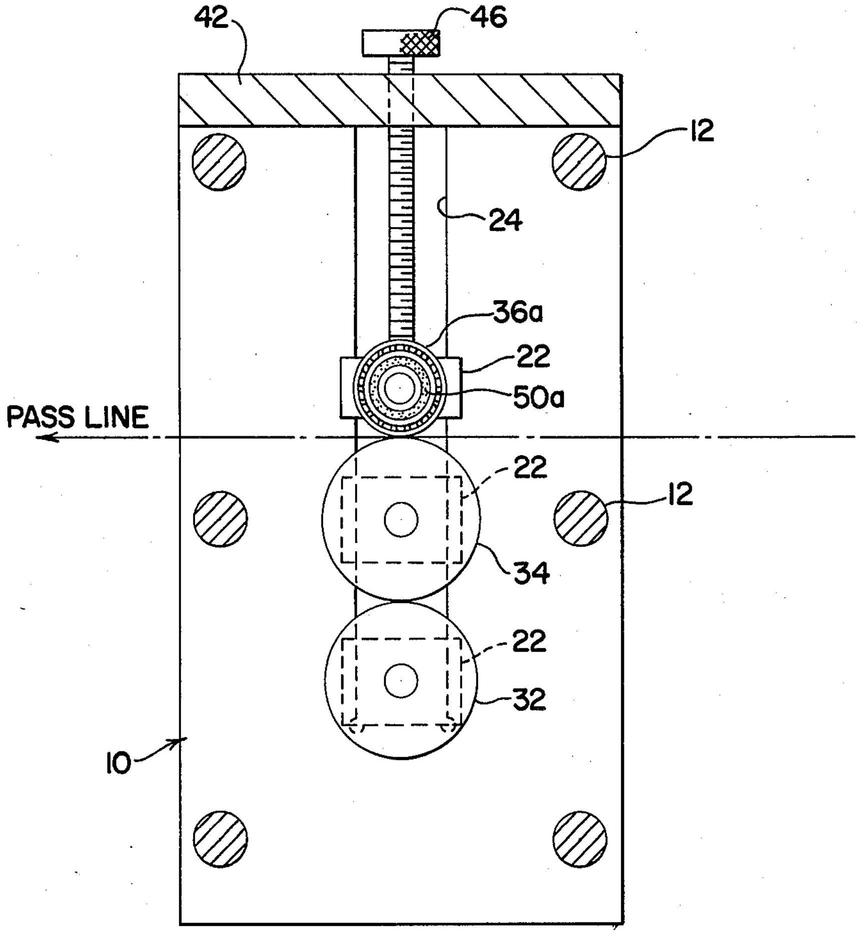
FIG. 8 is a side elevation, partly broken away, of the device shown in FIG. 7, taken from a plane at the left, or unillustrated, side of FIG. 7 similar to FIG. 2.

In the construction of FIGS. 7, 8, and 9, the pressure block 38, pressure rollers 39, and pressure screws 40 are eliminated and, instead, pressure screws 46 are provided, which tighten downwardly on the topmost bearing blocks 22, which are associated with the die roll 26. Again, the bearer associated with one of the pair of rolls 18, 26 is provided with a relatively readily deflectable intermediate portion. In this instance, the bearers **36*a* of the die roll 26 are provided with the annulus 50*a* (FIGS. 8-10), whose deflectability is relatively great as compared to the deflectability of other parts of the bearer construction. The construction of the bearer 36*a* may be generally similar to the construction of the bearer 34 of FIGS. 1-3**.

Figure 10:
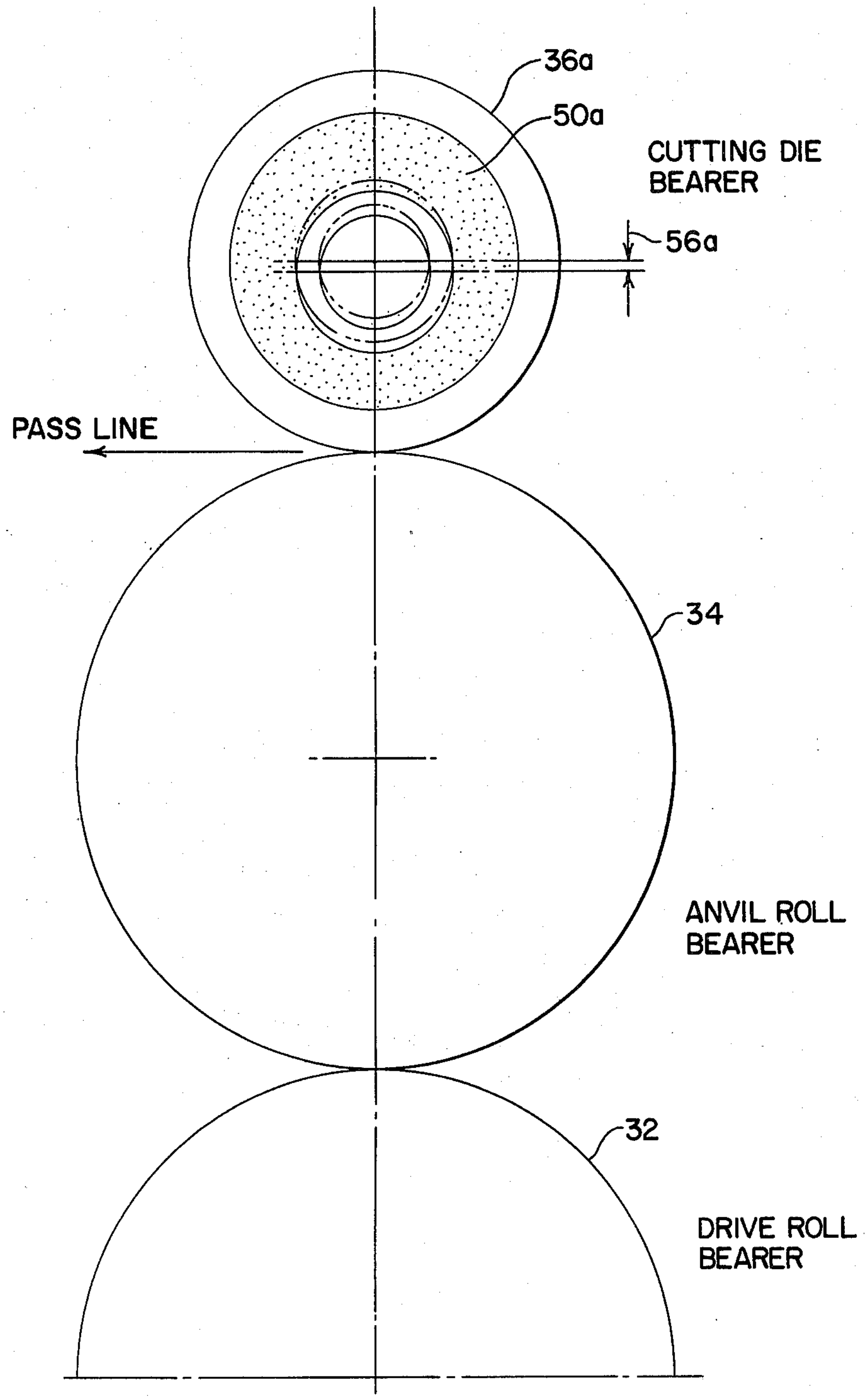
FIG. 10 is a diagrammatic view illustrating relative displacements between certain elements of the construction of FIGS. 7–9.

When the pressure screws are tightened, the uppermost bearing blocks 22 associated with the die roll 26 are moved toward the axis of the anvil roll 18, thereby increasingly deflecting the annuli **50*a* and increasingly displacing the axis of the die roll 26 toward the axis of the anvil roll 18. In FIG. 10, this spacing has been decreased by the amount of displacement 56*a***.

While the deflectable elements of the bearers 34 and **36*a* are illustrated as comprising ring-shaped deflectable elements, the deflectable elements may be of other shapes or arrangements. For example, in the arrangement of FIGS. 1-3, the deflectable element may be initially slightly eccentric or otherwise shaped to make the bearers 34 tend to be squeezed out from adjacent bearers 14 and 36 in one transverse direction in preference to the other. In general, without such preferential treatment, the bearers 34 will tend to move laterally in the direction of the pass line when the loading means, such as the pressure screws 40, are increasingly tightened down, as shown in FIG. 6**.

The bearers may be bigger or smaller in diameter than the roll surfaces, but the sum of the radii of adjacent bearers must exceed the sum of the radii of the corresponding adjacent rolls (die and anvil) by at least the desired maximum spacing between the roll surfaces. The bearers of such rolls as do not include the deflectable means may simply comprise the ends of the rolls. Deflectable means may be provided for both the die roll and the anvil roll.

The pressure screws 40 or 46 can be replaced by similar screws (not shown) constituting the output ends of control linkages for automatic roll spacing adjustment, so that the roll spacing may be automatically adjusted in response to a sensed value, for example, in response to sensed variance in label face stock.

A particular advantage of the invention is the fact that a die roll or anvil roll provided with deflectable means in the manner disclosed may be installed without special retrofitting in an existing press with little modification thereof, or even with no modification whatsoever.

Obviously, roll spacing may be differentially adjusted at opposed ends of the roll bearers by tightening down the pressure screws 40 or 46 at each end to differing degrees.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A roll assembly comprising first and second rolls each having bearers at its ends in rolling contact with corresponding bearers of the other roll to establish the spacing between the rolls, the bearers of the first roll being between the bearers of the second roll and additional bearers that are on the opposite side of the first roll from the second roll, the bearers of the first roll also being in rolling contact with the additional bearers, the bearers of the first roll each comprising a radially intermediate portion, a radially inner portion rotatable with the roll, and a radially outer portion whose periphery is in rolling contact with a bearer of the second pair of rolls and with one of the additional bearers, the intermediate portion of each bearer of the first roll transmitting bearing loads between its associated inner and outer portions but being independent from each of them with respect to rotation, the intermediate portion of each bearer of the first roll including an annulus whose deflectability is relatively great as compared to the deflectability of other parts of the bearer construction, whereby application and increase of clamping-force loading on opposite sides of the bearers of the first roll by the bearers of the second roll and the additional bearers while constraining the axis of the first roll against lateral movement tends to increasingly deflect the deflectable annuli and to increasingly laterally displace the radially outer portions of the bearers of the first roll out from between the bearers of the second roll and the additional bearers to thereby increasingly diminish the spacing between the first and second rolls.

2. A die roll subassembly comprising a die roll proper having a bearer at each end thereof, the bearers each comprising a radially intermediate portion, a radially inner portion rotatable with the roll, and a radially outer portion whose periphery is adapted to rollingly engage other bearers in a roll assembly, the intermediate portion of each bearer of the die roll transmitting bearing loads between its associated inner and outer portions but being independent from each of them with respect to rotation, the intermediate portion of each bearer of the die roll including an annulus whose deflectability is relatively great as compared to the deflectability of other parts of the bearer construction, whereby the application and increase of clamping-force loading on opposite sides of the bearers of the die roll by other bearers in a roll assembly while constraining the axis of the die roll against lateral movement will tend to increasingly deflect the deflectable annuli and increasingly augment the eccentricity between the peripheries of the radially outer portions of each bearer of the die roll and the axis of the die roll.

3. In a rotary die cutter assembly in which a web of material is passed between an anvil roll and a die roll whose axes are held in accurately spaced relationship by bearers at the ends of the rolls, means for adjusting the spacing between the axes and therefore between the two rolls comprising: bearers provided for a first of the two rolls which bearers are divided into radially intermediate portions, radially inner portions rotatable with the first roll and radially outer portions whose peripheries are adapted to rollingly engage the bearers of the second of the two rolls, the intermediate portion of each bearer of the first roll transmitting bearing loads between its associated inner and outer portions but being independent of each of them with respect to rotation, said intermediate portions each including deflection means whose deflectability is relatively great as compared to the deflectability of other parts of the associated bearers, and loading means for adjustably applying said bearing loads to thereby establish or maintain, and adjust, the degree of eccentricity between the axis of the first roll and the peripheries of the first roll's bearers.

4. The invention of claim 3, including bearer stacks which include the bearers of said two rolls and additional bearers that are on the opposite side of the first roll from the second roll, the loading means including a force-applying head for applying and adjustably increasing clamping-force loading on opposite sides of the first roll's bearers by the second roll's bearers and the additional bearers while constraining the axis of the first roll against lateral movement thereby tending to increasingly deflect said deflection means and to increasingly laterally displace the radially outer portions of the bearers of the first roll out from between the second roll's bearers and the additional bearers to thereby increasingly diminish the spacing between the first and second rolls.

5. The invention of claim 3, including bearing blocks for rotatably supporting the first roll, the loading means including means for applying and adjustably increasing forces to move said bearing blocks toward the axis of the second roll, thereby tending to increasingly deflect said deflection means and to increasingly displace the axis of the first roll toward the axis of the second to thereby increasingly diminish the spacing between the first and second rolls.

6. A roll assembly comprising first and second rolls each having bearers at its ends in rolling contact with corresponding bearers of the other roll to establish the spacing between the rolls, the bearers of the first roll being between the bearers of the second roll and additional bearers that are on the opposite side of the first roll from the second roll, the bearers of the first roll also being in rolling contact with the additional bearers, the bearers of the first roll each comprising a radially intermediate portion, a radially inner portion rotatable with the roll, and a radially outer portion whose periphery is in rolling contact with a bearer of the second pair of rolls and with one of the additional bearers, the intermediate portion of each bearer of the first roll transmitting bearing loads between its associated inner and outer portions but being independent from each of them with respect to rotation, the intermediate portion of each bearer of the first roll including an annulus whose deflectability is relatively great as compared to the deflectability of other parts of the bearer construction, the bearers of the first roll each having inner bearing means between its intermediate portion and its inner portion allowing such portions to be independent with respect to rotation while supporting radial loads between them, the bearers of the first roll each also having outer bearing means between its intermediate portion and its outer portion allowing such portions to be independent with respect to rotation while supporting bearing loads between them, whereby application and increase of clamping-force loading on opposite sides of the bearers of the first roll by the bearers of the second roll and the additional bearers while constraining the axis of the first roll against lateral movement tend to increasingly deflect the deflectable annuli and to increasingly laterally displace the radially outer portions of the bearers of the first roll out from between the bearers of the second roll and the additional bearers to thereby increasingly diminish the spacing between the first and second rolls.

7. A roll subassembly comprising a roll proper having a bearer at each end thereof, the bearers comprising radially intermediate portions, radially inner portions rotatable with the roll, and radially outer portions whose peripheries are adapted to rollingly engage other bearers in a roll assembly, the intermediate portion of each bearer of the roll transmitting bearing loads between its associated inner and outer portions but being independent from each of them with respect to rotation, the intermediate portion of each bearer of the roll including deflection means whose deflectability is relatively great as compared to the deflectability of other parts of the bearer construction, whereby the application and increase of bearing loads between the inner and outer portions of the roll's bearers will tend to increasingly deflect the deflection means and increasingly augment the eccentricity between the axis of the roll and the peripheries of the radially outer portions of the roll's bearers.

8. In a rotary die cutter assembly in which a web of material is passed between an anvil roll and a die roll whose axes are held in accurately spaced relationship by bearers at the ends of the rolls, means for providing adjustable spacing between the two rolls by adjustably displacing, relatively to each other (1) the axis of one of the rolls and (2) the peripheries of the bearers associated with such roll, such means including the bearers associated with such roll, such bearers having radially inner and radially outer portions and having radially intermediate portions that are rotatable independently of both said radially inner and radically outer portions, said radially intermediate portions including deflection means whose deflectability is great as compared to the deflectability of other parts of the bearer construction, and means for applying and adjustably increasing bearing loads across said deflection means to accomplish the adjustable relative displacement.

* * * * *